R. F. C. LEITHOLD.
SUBMARINE PHOTOGRAPHIC APPARATUS.
APPLICATION FILED OCT. 19, 1914.
1,179,330.
Patented Apr. 11, 1916.
4 SHEETS—SHEET 2.
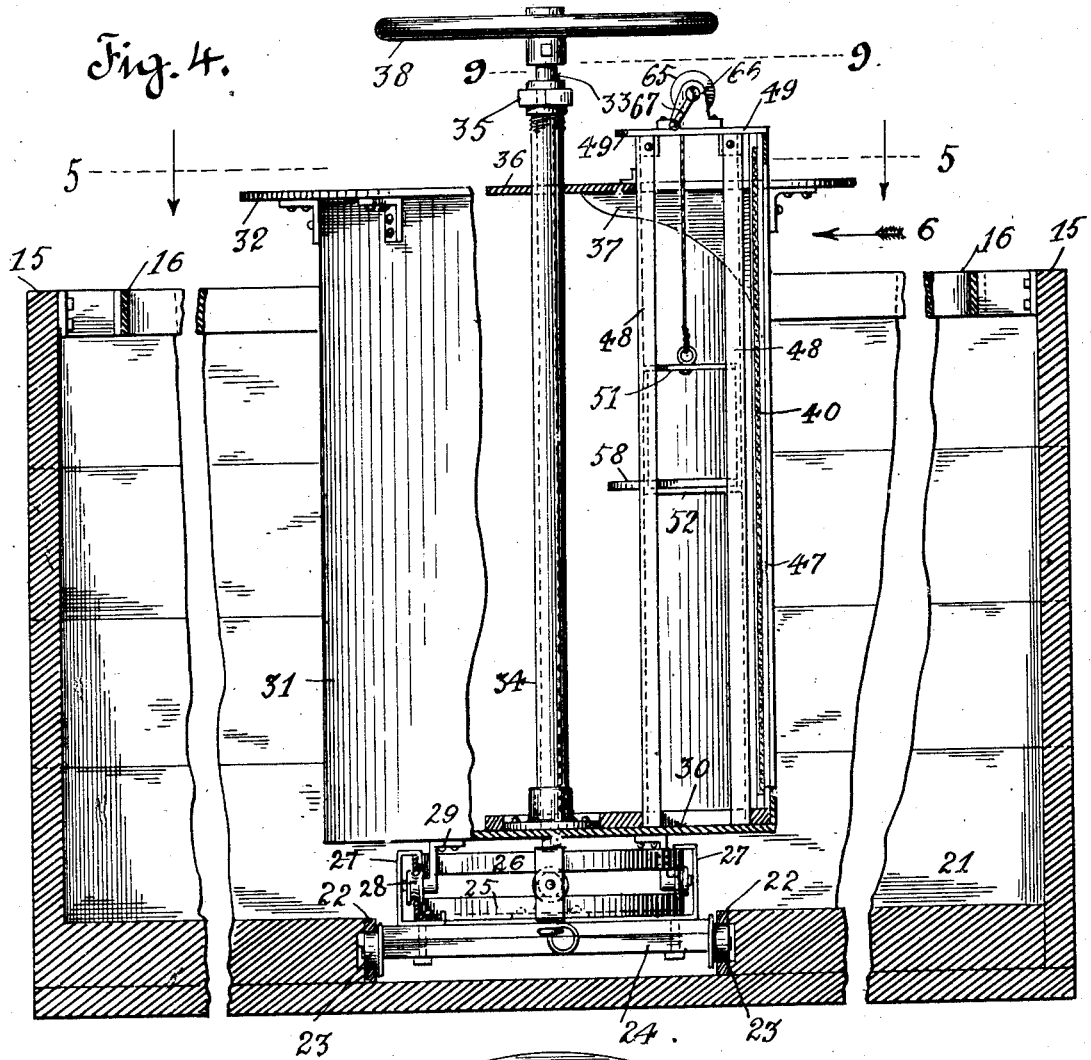
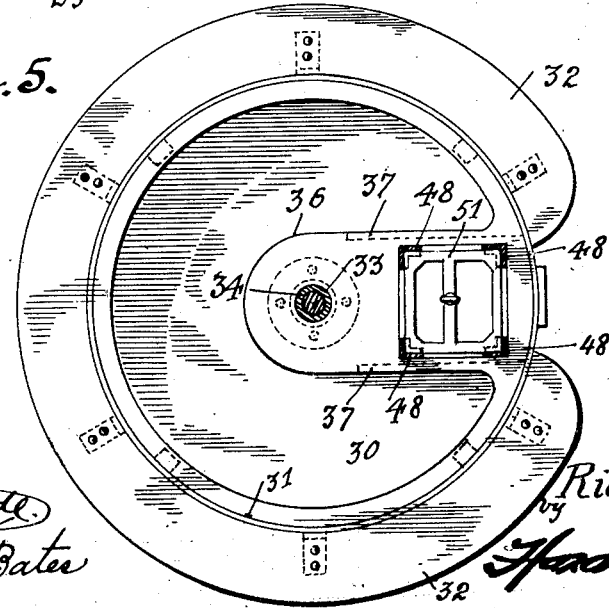

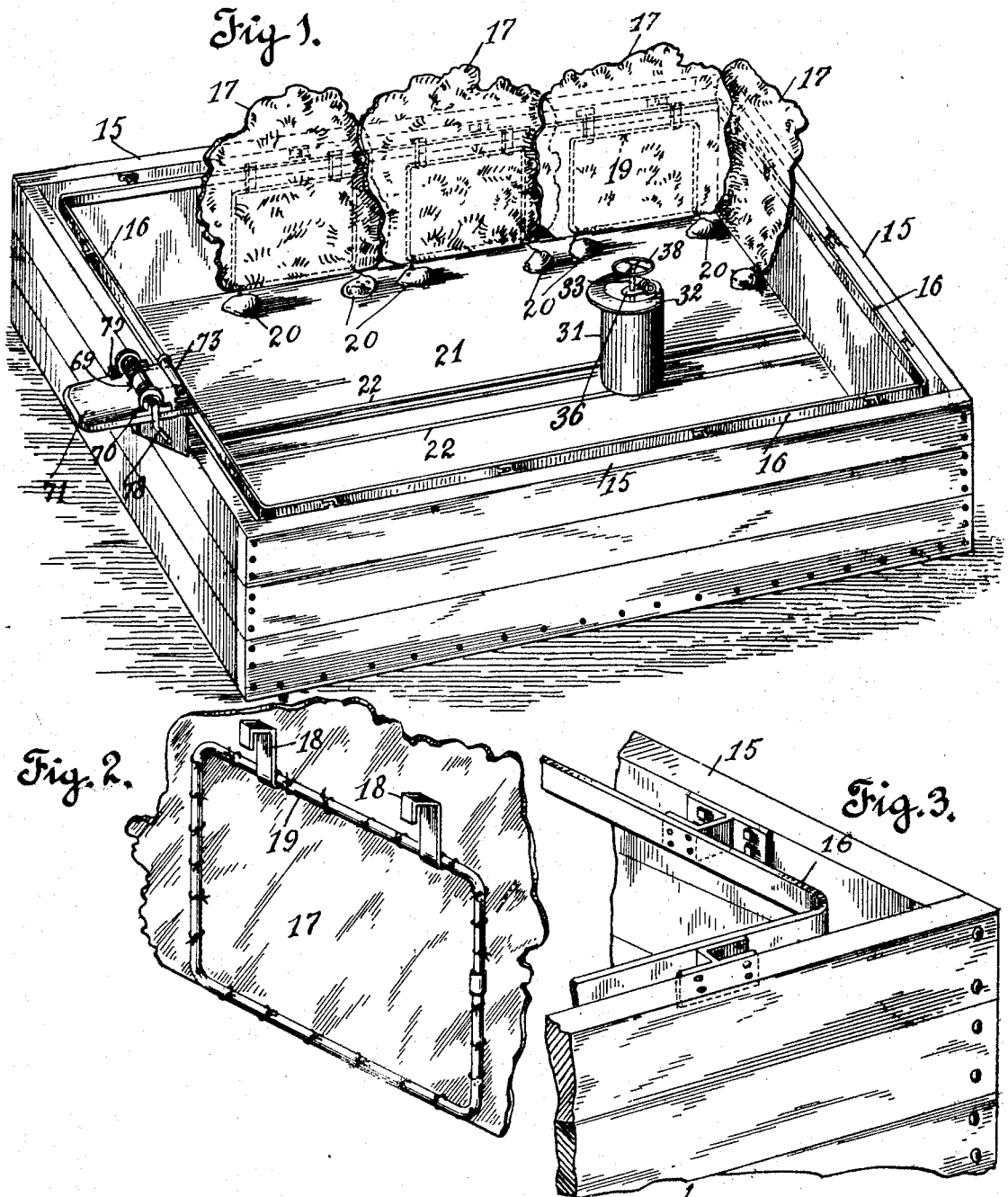

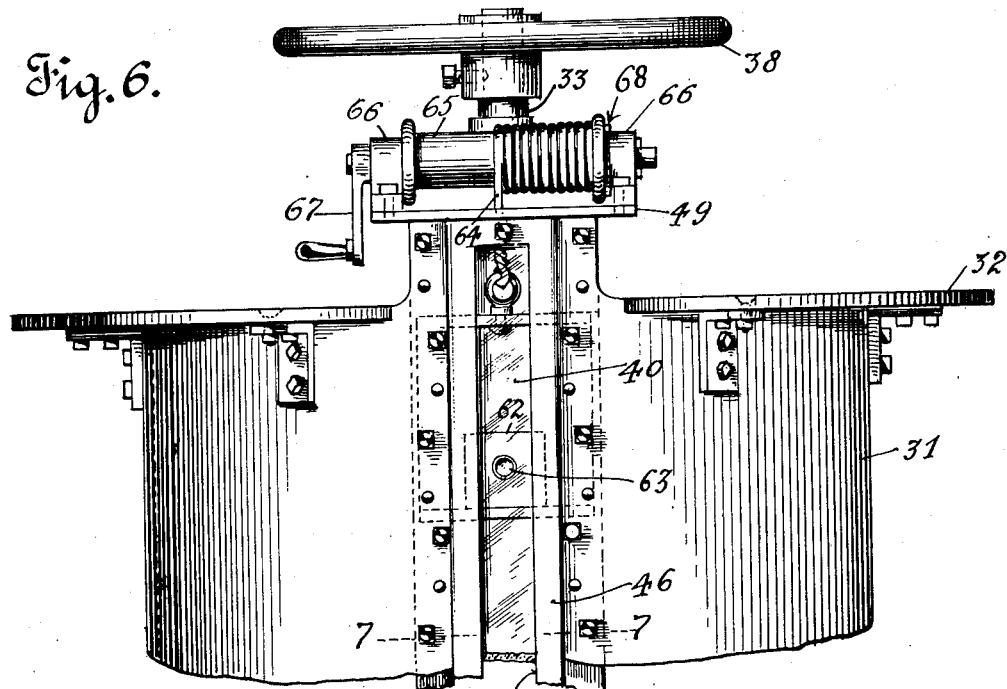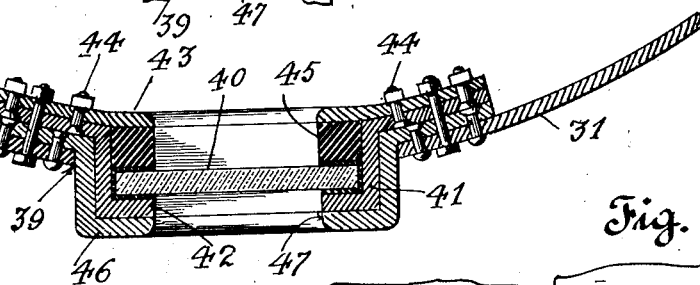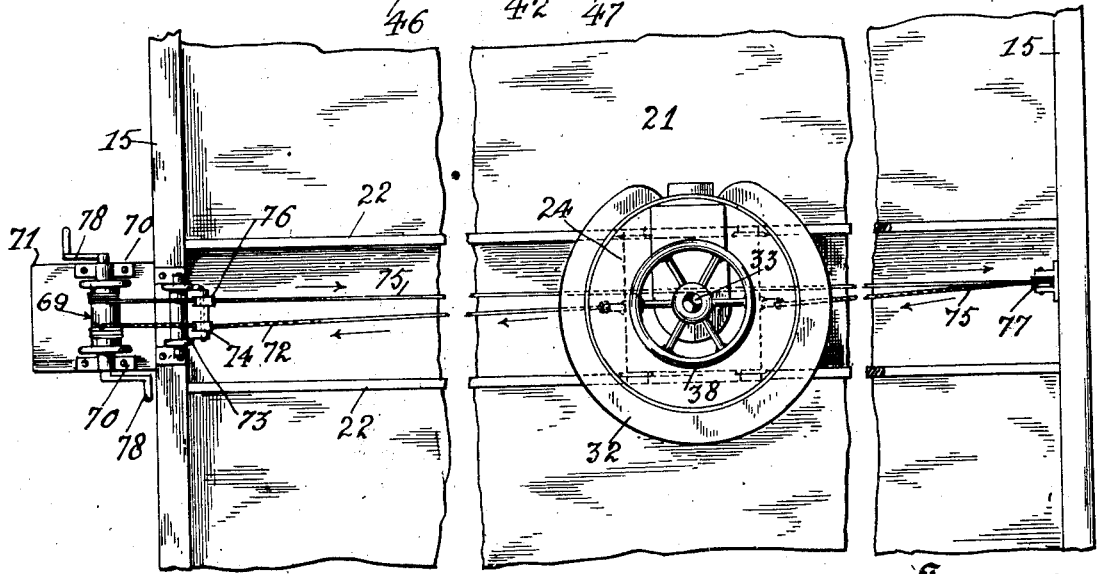

R. F. C. LEITHOLD.
SUBMARINE PHOTOGRAPHIC APPARATUS.
APPLICATION FILED OCT. 19, 1914.
1,179,330.
Patented Apr. 11, 1916.
4 SHEETS—SHEET 4.
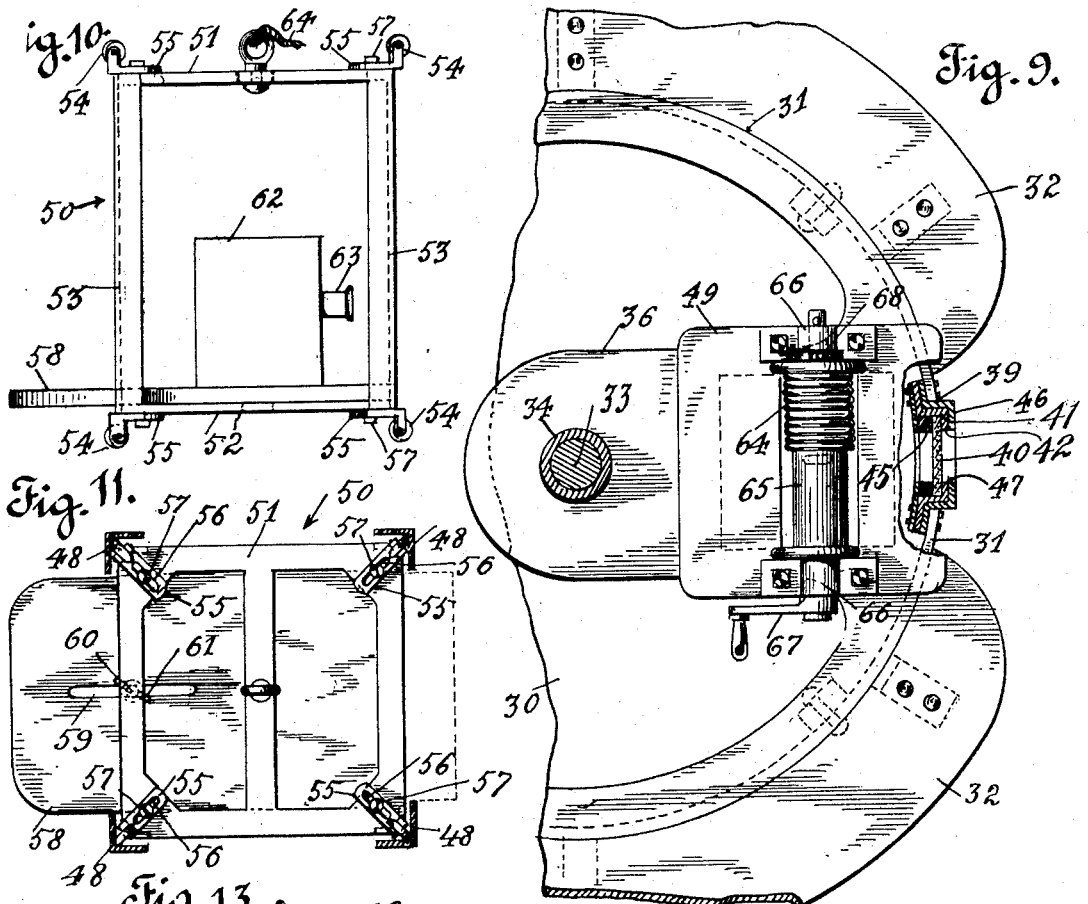
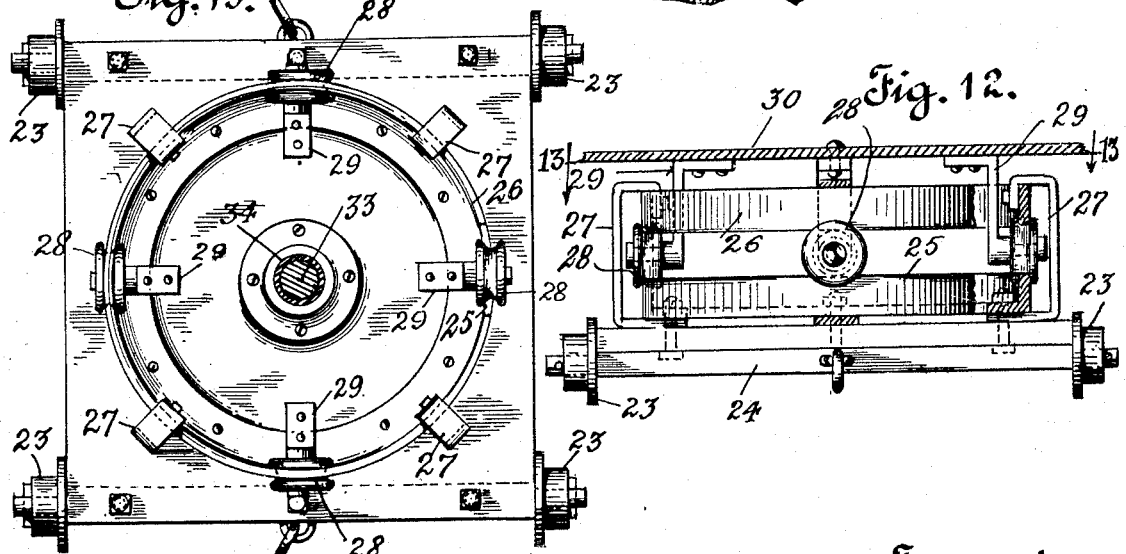
Witnesses,
Inventor,
by Rialto F. C. Leithold,
Attys.

UNITED STATES PATENT OFFICE.

RIALTO F. C. LEITHOLD, OF LOS ANGELES, CALIFORNIA, ASSIGNOR OF FORTY ONE-HUNDREDTHS TO HOWARD THURSTON, OF NEW YORK, N. Y.

SUBMARINE PHOTOGRAPHIC APPARATUS.

1,179,330. Specification of Letters Patent. Patented Apr. 11, 1916.

Application filed October 19, 1914. Serial No. 867,557.

*To all whom it may concern:*

Be it known that I, RIALTO F. C. LEITHOLD, a citizen of the United States, residing at Los Angeles, in the county of Los Angeles, State of California, have invented new and useful Improvements in Submarine Photographic Apparatus, of which the following is a specification.

This invention relates to a submarine photographic apparatus, and particularly pertains to a mechanism for producing submarine effects in motion pictures.

It is the object of this invention to provide an apparatus for photographing submarine effects in which photographic operations may be conducted above the surface of a body of water and by conveying the photographic apparatus comprising a motion picture camera from points above the surface of the water to points beneath the surface thereof without stopping the camera mechanism, and by means of which photographic effects of passing in and out of the body of water will be obtained.

Another object is to provide a carrier for a motion picture camera, whereby the effect of traveling beneath a body of water in universal directions may be produced.

A further object is to provide a movable casing adapted to be shifted on a submerged track and rotated independent of its track mounting.

Another object is to provide a scenic tank or reservoir so constructed that various scenes and background effects may be obtained therein by interchangeable and movable scenery.

The invention is illustrated in the accompanying drawings, in which:

Figure 1 is a perspective view of the scenic tank showing the camera transporting apparatus disposed therein. Fig. 2 is a detail in perspective of the rear portion of the scenic section showing the construction thereof by which it is shiftably attached to the sides of the reservoir. Fig. 3 is a detail in perspective illustrating the construction of the reservoir whereby a mounting is obtained for the scene sections. Fig. 4 is a detail view in vertical section and elevation showing the construction of the reservoir and the revoluble and transversely movable casing. Fig. 5 is a horizontal section and plan view on the line 5—5 of Fig. 4. Fig. 6 is a detail in elevation of the upper portion of the revoluble casing as seen in the direction of the arrow 6 in Fig. 4. Fig. 7 is an enlarged horizontal section on the line 7—7 of Fig. 6. Fig. 8 is a detail plan view illustrating the manner of shifting the casing transversely of the reservoir. Fig. 9 is an enlarged detail plan view on the line 9—9 of Fig. 4 with parts broken away. Fig. 10 is a view in side elevation of the vertically reciprocal camera carriage. Fig. 11 is a plan view of the carriage illustrating same as disposed in its vertical guides. Fig. 12 is a detail elevation of the lower portion of the casing illustrating the rotary mounting and supporting truck thereof. Fig. 13 is a plan view on the line 13—13 of Fig. 12.

More specifically, 15 indicates the walls of a reservoir which is preferably rectangular in form, of any suitable dimensions and adapted to receive a body of water approximately eight feet in depth. The walls 15 are fitted with a rail 16 adjacent their upper edges which extends entirely therearound and forms a support for a series of scenic members 17 preferably formed of sheet metal of the desired configurations and carrying hooked brackets 18 attached to frames 19 on the rear faces thereof, which hooks are adapted to be detachably engaged with the rail 16. The front faces of the scenic members 17 carry pictorial representations of such scenery as it is desired to produce in the background of the picture.

Suitable weights 20 are provided for anchoring the lower portion of the scenic member 17; these weights or anchors 20 being formed to represent rocks or other formations, such as are found in the depths of natural bodies of water.

The bottom 21 of the reservoir is provided with parallel channeled rails 22 which are here shown as extending transversely across the reservoir and are adapted to receive rollers 23 formed on a truck frame 24; this truck frame 24 being adapted to be shifted transversely of the reservoir with the upper wall of the channeled rails engaging the rollers 23 to oppose upward movement of the truck 24 occasioned by the tendency of the super-structure carried by the truck 24 to float in the body of water encompassing same.

Mounted on the truck 24 is a pair of superposed circular rails 25 and 26 connected together by standards 27 and adapted to receive rollers 28 mounted on hangers 29 depending from the bottom wall 30 of a cylindrical casing 31. The casing 31 extends upwardly to a point above the surface of the body of water contained in the reservoir and is fitted with a running board 32 at its upper open end. As a means for stabilizing the casing 31 a standard 33 rigidly mounted on the truck 24 is carried upward through a tube 34 supported on the bottom wall 30 of the casing 31 and terminating a short distance above the upper end of the casing 31 with the upper end thereof fitted with a stuffing box 35 through which the standard 33 extends.

The upper end of the tube 34 is braced by passing through a plate 36 extending inwardly from the upper edge of the cylindrical casing 31 and supported on spaced brackets 37. The upper end of the standard 33 is fitted with a hand-wheel 38 rigidly mounted thereon which is adapted to be grasped by a person standing on the running board 32 in such manner that a pull on the hand-wheel 38 will effect the rotation of the casing 31 on the circular rails 25 and 26. The casing 31 is formed with a vertical slot 39 which is covered by a suitable packed transparent plate 40 extending from the bottom of the casing 31 to a point above the upper end thereof as shown in Fig. 6.

The plate 40 is mounted in a frame 41 which is fitted with a flange 42 engaging the marginal edge of the plate 40 and carries a demountable plate 43 secured to the rear portion thereof by means of bolts 44; a suitable packing 45 being interposed between the plate 43 and the rear face of the transparent plate 40 and extending around the edges of the plate 40 between the latter and the flanges 42 to form a water-tight seal between the plate 40 and its frame. This frame 41 is demountably secured to the cylindrical casing 31 and extends into a corresponding rectangular frame 46 secured to the casing 31 and extending through the slot 39; the frame 46 having an opening 47 formed therein corresponding to the opening surrounded by the flange 42 on the frame 41.

Mounted within the casing 31 rearward of the transparent plate 44 is a series of vertically extending angular guide members 48 arranged on the four corners of a rectangle and which are rigidly secured at their lower ends to the bottom member 30 of the casing 31 and are attached at their upper ends to a platform 49 disposed on a plane slightly above the running board 32. Mounted to slide vertically within the guide rails 48 is a carriage 50 having rectangular top and bottom frames 51 and 52 respectively connected together at their corners by angle irons 53. The carriage 50 is fitted with rollers 54 at the four corners of the frames 51 and 52 which are mounted on plates 55 formed with longitudinal slots 56.

The plates 55 are adjustably secured to the rectangular frames 51 and 52 by means of set bolts 57 which extend through the slots 56 and are threaded into the frames 51 and 52 with their heads adapted to engage the marginal edges of the slots 56 to clamp the plates 55 on the frames 51 and 52 in such position that the rollers 54 will extend into the angles of the guide rails 48 as particularly shown in Fig. 11. The plates 55 are thus adjustably mounted to center the carriage 50 in relation to the guide rails 48.

Mounted on the frame 52 is a slidable panel 58 formed with a slot 59 through which a threaded stud 60 extends. This stud 60 is provided with a wing nut 61 adapted to engage the marginal edges of the slot 59 to clamp the panel 58 on the frame 52 against movement in relation to the latter. The panel 58 may thus be adjusted longitudinally so as to dispose a motion picture camera 62 carried thereby in various positions in relation to the transparent plate 40; the lens 63 of the camera 62 being disposed in such position as to face the transparent plate 40. The carriage 50 is supported on a cable 64 which is wound on a reel 65 supported in suitable bearings 66 carried on the platform 49 and which reel is fitted with a crank 67 by which the cable 64 may be wound or unwound on the drum 65. A pawl and ratchet mechanism 68 is provided by means of which the reel 65 may be locked to dispose the carriage 50 in any desired position and at various elevations within the casing 31.

The mechanism for shifting the casing 31 in either direction transversely of the reservoir consists of a drum 69 revolubly mounted in bearings 70 carried on a platform 71 mounted on the side wall 15 of the reservoir at one end of the transverse rails 22. Wound around the drum 69 is a cable 72 which passes over a direction roller 73 on the upper edge of the reservoir wall 15 and thence passes downwardly under a direction roller 74, from whence it extends horizontally and is connected to one side of the truck 24. Wound on the drum 69 in a direction opposite that of the cable 72 is a cable 75 which passes over the direction roller 73, thence downwardly and under a direction roller 76, from whence it extends horizontally to the opposite side of the reservoir and is passed over a direction roller 77 with its outer end secured to the truck 24 opposite the connection with the cable 72. The drum 69 is fitted with a hand-crank 78 by means of which it may be rotated to cause one of the cables 72 or 75 to wind thereon and the other to unwind therefrom so as to advance the truck 24 in either direction on the rails 22 according to the direction of rotation of the drum 69.

In the operation of the invention, suitable scenic members 17 are arranged on the walls 15 of the reservoir and the latter is filled with water to a suitable depth. Motion pictures may then be taken to represent submarine effects by operating the camera 62 with the latter disposed in a position within the casing 31 below the surface of the water within the reservoir; the vertical position of the camera being adjusted by varying the level of the carriage 50 by means of the reel 65. To obtain effects of traveling beneath the surface of the water the camera 62 is disposed at suitable levels or is raised and lowered by being operated by means of the reel 65 simultaneously with the transverse movement of the casing 31 which is effected by operating the drum 69. The effect of passing from above the surface of the water therebeneath and vice versa, is obtained by raising and lowering the camera back and forth from points above the surface of the water to points therebeneath; the casing 31 being of such height and the carriage 50 movable therein to such an elevation that motion pictures may be taken above the surface of the water in the reservoir.

What I claim is:

1. An apparatus for photographing submarine effects, comprising a casing adapted to be partially submerged in a body of water, means to move said casing along the bottom of said body of water, a camera supporting means mounted in said casing, and means to operate said camera supporting means.

2. An apparatus for producing submarine pictures, comprising a movable casing adapted to be partially submerged within a body of water, a camera supporting carriage mounted therein, guides in which said carriage is mounted for vertical reciprocal movement, means by which the carriage may be moved longitudinally in relation to the said casing, and means whereby the casing may be rotated around an axis within the body of water.

3. An apparatus for producing submarine pictures, comprising a movable casing adapted to be partially submerged within a body of water, a camera supporting carriage mounted therein, guides in which said carriage is mounted for vertical reciprocal movement, means by which the carriage may be moved longitudinally in relation to the said casing, and means whereby the casing may be rotated around an axis within the body of water, said means for reciprocating the carriage vertically and longitudinally and giving the casing a rotary movement being adapted to be operated singly or in unison.

4. An apparatus for producing pictures of submarine effects, comprising a reservoir adapted to contain a body of water, a truck, means for shifting said truck within the reservoir from a point exteriorly thereof, a revoluble casing carried by said truck formed with a vertical slot extending above and below the surface of the water in the reservoir, a transparent plate closing said slot, and a vertically movable camera supporting carriage arranged within said casing adjacent the slot therein.

5. An apparatus for producing submarine pictures, comprising a reservoir adapted to contain a body of water, a wheeled truck arranged in the reservoir, means for shifting said truck from a point exteriorly of the reservoir, a revoluble casing carried by said truck extending above and below the surface of the water in the reservoir and having a vertical slot therein, a transparent plate covering said slot, vertical guides arranged rearward of said slot within the casing, a camera carriage slidably mounted in said guide, and means for reciprocating said carriage.

6. In an apparatus for photographing submarine effects, a submerged wheeled truck, a revoluble casing supported on said truck extending above the surface of the water in which the truck is submerged having a slot in the side thereof, a transparent plate covering said slot, a camera supporting carriage mounted to reciprocate vertically rearward of said slot, a cable from which said carriage is suspended, and a reel carried by the casing around which said cable is wound and by means of which the carriage may be raised and lowered.

7. In an apparatus for photographing submarine effects, a truck adapted to be submerged in a body of water, a casing revolubly mounted on said truck extending above and below the surface of the water and having a vertically extending slot therein, a transparent plate covering said slot, a tube attached to the bottom of said casing and extending upwardly therefrom, a standard secured to the truck projecting through said tube and terminating thereabove, a hand-wheel rigidly mounted on said standard, and a running board on said casing below the hand-wheel, whereby a person standing on the running board and pulling on the hand-wheel will effect the rotation of the casing.

In witness that I claim the foregoing I have hereunto subscribed my name this 6th day of October, 1914.

RIALTO F. C. LEITHOLD.

Witnesses:
MARGUERITE BATES,
MARIE BATTEY.